United States Patent
Glatfelter et al.

(10) Patent No.: US 10,419,468 B2
(45) Date of Patent: Sep. 17, 2019

(54) CYBER SECURITY SYSTEM WITH ADAPTIVE MACHINE LEARNING FEATURES

(71) Applicant: The Boeing Company, Chicago, IL (US)

(72) Inventors: John W. Glatfelter, West Chester, PA (US); William D. Kelsey, Issaquah, WA (US); Brian D. Laughlin, Wichita, KS (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 15/647,173

(22) Filed: Jul. 11, 2017

(65) Prior Publication Data
US 2019/0020669 A1 Jan. 17, 2019

(51) Int. Cl.
| | |
|---|---|
| H04L 29/06 | (2006.01) |
| G06N 20/00 | (2019.01) |
| G06F 21/31 | (2013.01) |
| G06F 21/55 | (2013.01) |
| H04W 12/12 | (2009.01) |
| H04W 12/00 | (2009.01) |

(52) U.S. Cl.
CPC ........ H04L 63/1425 (2013.01); G06F 21/316 (2013.01); G06F 21/552 (2013.01); G06F 21/554 (2013.01); G06N 20/00 (2019.01); H04L 63/1416 (2013.01); H04L 63/1433 (2013.01); H04W 12/12 (2013.01); H04L 63/1491 (2013.01); H04W 12/00508 (2019.01)

(58) Field of Classification Search
CPC .................................................. H04L 63/1425
See application file for complete search history.

(56) References Cited

U.S. PATENT DOCUMENTS

| 9,185,083 B1 | 11/2015 | Glatfelter et al. |
| 9,262,641 B1 | 2/2016 | Laughlin et al. |

(Continued)

FOREIGN PATENT DOCUMENTS

WO 2008001972 A1 1/2008

OTHER PUBLICATIONS

Ben Dickson, Exploiting Machine Learning in Cybersecurity, Crunch Network, Jul. 1, 2016, pp. 1-6, retrieved from https://techcrunch.com/2016/07/01/exploitingmachinelearningincybersecurity/ on May 5, 2017.

(Continued)

*Primary Examiner* — Simon P Kanaan
(74) *Attorney, Agent, or Firm* — Duft & Bornsen, PC

(57) ABSTRACT

Systems and methods for a cyber security system with adaptive machine learning features. One embodiment is a system that includes a server configured to manage a plurality of user devices over a network, and a user device that includes an interface and a processor. The interface is configured to communicate with the server over the network, and the processor implements a machine learning function configured to monitor user interactions with the user device over time to establish a use profile, to detect anomalous use of the user device based on a variance from the use profile, to determine whether the anomalous use is representative of a security threat, and to instruct the user device to perform one or more automatic actions to respond to the security threat.

23 Claims, 13 Drawing Sheets

(56) References Cited

U.S. PATENT DOCUMENTS

| | | | |
|---|---|---|---|
| 9,395,810 B2 | 7/2016 | Laughlin et al. | |
| 9,628,507 B2 | 4/2017 | Haq et al. | |
| 2002/0157020 A1* | 10/2002 | Royer | H04L 63/1425 726/11 |
| 2009/0328216 A1 | 12/2009 | Rafalovich et al. | |
| 2010/0125912 A1 | 5/2010 | Greenshpon et al. | |
| 2013/0254885 A1 | 9/2013 | Devost | |
| 2014/0354529 A1 | 10/2014 | Laughlin et al. | |
| 2015/0213246 A1 | 7/2015 | Turgeman et al. | |
| 2015/0242760 A1 | 8/2015 | Miao et al. | |
| 2016/0182545 A1 | 6/2016 | Stolfo et al. | |
| 2016/0188862 A1 | 6/2016 | Singh et al. | |
| 2016/0205128 A1 | 7/2016 | Holtmanns et al. | |
| 2016/0283860 A1 | 9/2016 | Pycock et al. | |

OTHER PUBLICATIONS

Larry Loeb, Researchers Try to Create Malware Chip, Nov. 15, 2016, pp. 1-3, retrieved from https://securityintelligence.com/news/researcherstrytocreatemalwarechip/ on May 5, 2017.

Barry M. Horowitz and Kate Pierce, System Aware Cyber Security, pp. 1-41, University of Virginia, Apr. 2012. Retrieved from http://csrc.nist.gov/news_events/cps-workshop/slides/presentation-4_horowitz-pierce.pdf on May 5, 2017.

Ibrahim, Badr, and Shaheen, Adaptive Layered Approach using Machine Learning Techniques with Gain Ratio for Intrusion Detection Systems, Arab Academy for Science, Technology and Maritime Transport Cairo, Egyptt, International Journal of Computer Applications (0975-8887) vol. 56—No. 7, Oct. 2012. Retreived from https://arxiv.org/ftp/arxiv/papers/1210/1210.7650.pdf on May 5, 2017.

Djordjevic, Nair, and Dimitrakos, Virtualised Trusted Computing Platform for Adaptive Security Enforcement of Web Services Interactions, SOA Security, Security Research Centre, British Telecommunications, UK, Department of Computer Science, Vrije Universiteit, Amsterdam, The Netherlands, pp. 1-8, 2007 IEEE International Conference on Web Services (ICWS 2007). Retrieved from http://srijith.net/vu/publications/confs/ICWS07.pdf on May 5, 2017.

Kulkami, Pino, and Mohsenin, Adaptive realtime Trojan detection framework through machine learning, Department of Computer Science & Electrical Engineering, University of Maryland, Baltimore County, Hardware Oriented Security and Trust (HOST), 2016 IEEE International Symposium, pp. 1-4, May 3-5, 2016, McLean, VA, USA. Retrieved from http://ieeexplore.ieee.org/document/7495568/ on May 5, 2017.

European Search Report; Application EP18182207; dated Nov. 7, 2018.

* cited by examiner

CYBER SECURITY SYSTEM WITH ADAPTIVE MACHINE LEARNING FEATURES

FIELD

The disclosure relates to the field of cyber security, and in particular, to machine learning in cyber security.

BACKGROUND

Cyber security risks for large organizations have become increasingly complex due to the proliferation of network connected devices used in everyday business activities. End user devices such as employees' smartphones may expose sensitive information of the user or organization as a result of targeted cyber threats or physical theft of a device. Conventional approaches to tracking and protecting against such threats do not provide adequate information to efficiently detect, resolve, and understand the impact of device vulnerabilities throughout a large organization.

SUMMARY

Embodiments described herein provide for a cyber security system with adaptive machine learning features. An end user device managed by an Information Technology (IT) system is equipped with a local machine learning function. The machine learning function establishes a user signature that is unique to the particular behavior patterns learned from monitoring use of the user device over time. The user signature is used by the machine learning function to define and detect abnormal use events for the user device, such as use which suggests the user device is stolen, being used by an unauthorized user, or is compromised by malware. After detecting such an event, the machine learning function triggers a series of automatic actions to respond to the security threat. The particular action or sequence of actions taken may adapt over time with the machine learning function to effectively mine data for the suspected threat event including interrogation of bad actor networks and devices and attempts to access specific information or resources on the user device. The mined data may be sent to a central or remote management server also equipped with machine learning functions to identify attack patterns and provide the user device with specific instructions or data (e.g., misinformation to provide to access requests) for responding to the security threat.

One embodiment is a system that includes a server configured to manage a plurality of user devices over a network, and a user device that includes an interface and a processor. The interface is configured to communicate with the server over the network, and the processor implements a machine learning function configured to monitor user interactions with the user device over time to establish a use profile, to detect anomalous use of the user device based on a variance from the use profile, to determine whether the anomalous use is representative of a security threat, and to instruct the user device to perform one or more automatic actions to respond to the security threat.

Another embodiment is an apparatus that includes a processor configured to detect anomalous use of a user device based on historical use of the user device, to input information of the anomalous use into a machine learning function, and to determine a characteristic of a cyber threat from an output of the machine learning function. The processor is also configured to determine an automatic action for the user device to perform based on the characteristic of the cyber threat, and to instruct the user device to perform the automatic action to respond to the cyber threat.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
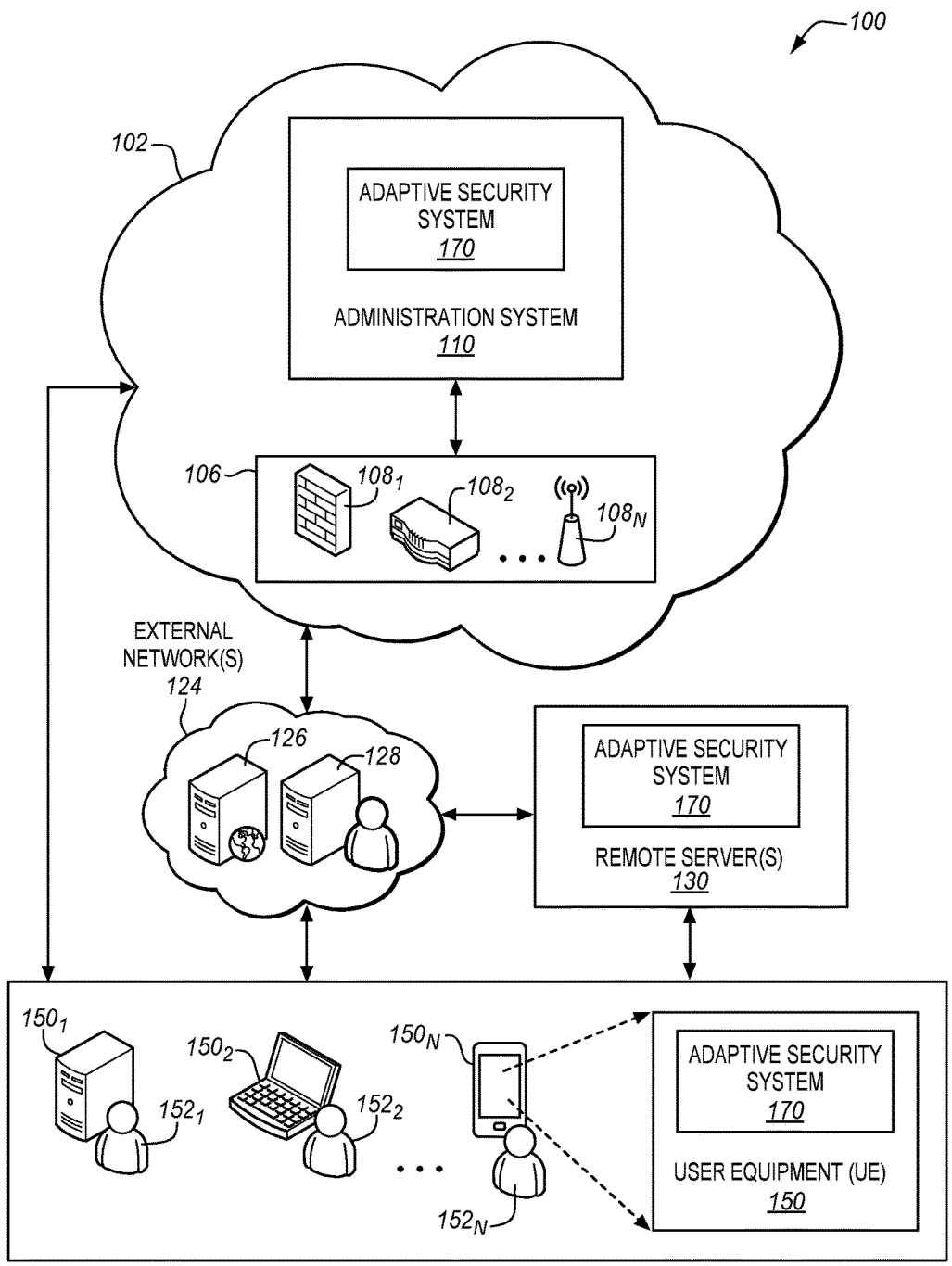
FIG. 1 illustrates an enterprise network environment in an exemplary embodiment.

FIG. 1 illustrates an enterprise network environment 100 in an exemplary embodiment. The enterprise network environment 100 includes an enterprise network 102 with an administration system 110 that manages computer security for a large organization or enterprise. The enterprise network 102 also includes an intrusion detection system 106 formed by edge devices $108_{1, 2 \ldots N}$ such as servers, gateways, firewalls, routers, and other network elements that monitor traffic between the enterprise network 102 and external network(s) 124 and report/block traffic that is suspicious. The enterprise network 102 supports User Equipment (UE) $150_{1, 2 \ldots N}$ operated by respective users $152_{1, 2 \ldots N}$ to perform various computer tasks. The UE 150 may include, for example, personal computers, laptops, smartphones, etc. The UE 150 may be operated by employees or customers of the enterprise.

As shown in FIG. 1, the UE 150 may interface with the enterprise network 102 directly (e.g., operate in) or indirectly (e.g., operate outside of) via one or more external networks 124. In any case, the UE 150 may access external resources 126 such as websites, databases, and servers over the external network 124 such as the Internet. Some of the external resources 126, or a malicious actor 128 on the external network 124, may pose security threats to the UE 150. Security threats may include manual or automated attacks which attempt to access sensitive or valuable information pertaining to the enterprise via the UE 150.

Many modern security threats include sophisticated techniques to automatically evolve the threat over time to evade existing detection/response mechanisms. Moreover, sensitive or valuable enterprise information is increasingly subject to attacks that target devices outside the enterprise network 102 (e.g., mobile devices) which may be exploited at a later time inside the enterprise network 102. In previous systems, attacks involving the exploitation or physical theft of network-connected devices related to the enterprise are difficult to detect and security personnel are generally unable to collect information related to the source of the attack which might otherwise be used to identify and remediate security vulnerabilities of the enterprise.

Therefore, to improve computer security of the enterprise network environment 100, the administration system 110, a remote server 130, and the UE 150 may be enhanced with an adaptive security system 170. For the UE 150, the adaptive security system 170 may detect and respond to security threats based on a behavior profile that is unique to a particular device. That is, each UE 150 may operate with different capabilities, in different environments, and by different users 152, and the adaptive security system 170 may control automatic security actions according to local use and settings of each UE 150. For the remote server 130, the adaptive security system 170 may provide supporting functions to the UE 150 for an on-going security threat. For the administration system 110, the adaptive security system 170 may provide analysis of system-wide security threat patterns to establish attacker profiles and security rules. It will be appreciated that the enterprise network environment 100 is an exemplary environment for discussion purposes and that the features of the adaptive security system 170 described herein may be employed in alternative environments and applications. Illustrative examples and details of the operation of the adaptive security system 170 with respect to the administration system 110, the remote server 130, and the UE are discussed below.

Figure 2:
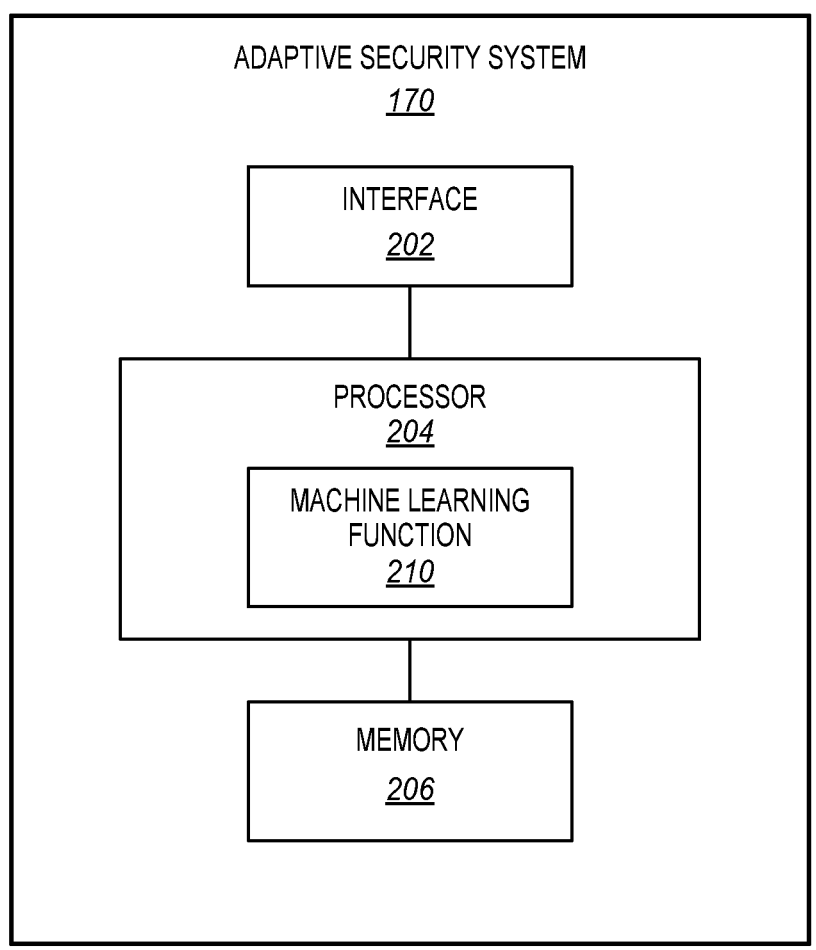
FIG. 2 is a block diagram of an adaptive security system in an exemplary embodiment.

FIG. 2 is a block diagram of the adaptive security system 170 in an exemplary embodiment. The adaptive security system 170 includes an interface component 202, one or more processors 204, and a memory 206. The interface component 202 may comprise a hardware component or device (e.g., transceiver, antenna, etc.) configured to communicate over a network such as the external network 124 and/or enterprise network 102 to exchange messages with UE 150, the remote server 130, or the administration system 110. The processor 204 represents the internal circuitry, logic, hardware, etc., that provides the functions of the adaptive security system 170. The memory 206 is a computer readable storage medium (e.g., read only memory (ROM) or flash memory) for data, instructions, applications, etc., and is accessible by the processor 204. The adaptive security system 170 may include various other components not specifically illustrated in FIG. 2.

The processor 204 implements a Machine Learning Function (MLF) 210. The MLF 210 may be implemented in any combination of hardware, firmware, and/or software operable to implement machine learning techniques. Machine learning generally refers to an automated process capable of parsing input data, learning from the data, and then adapting its output based on its learning. This differs from traditional computer processes where instructions or programming is predefined and explicit such that the same steps are repeated given the same input. That is, rather than having activities defined in advance, the MLF 210 may be trained to observe patterns in data and adaptively adjust actions or steps to take over time without explicit hand-coded programming or user intervention/instruction.

Figure 3:
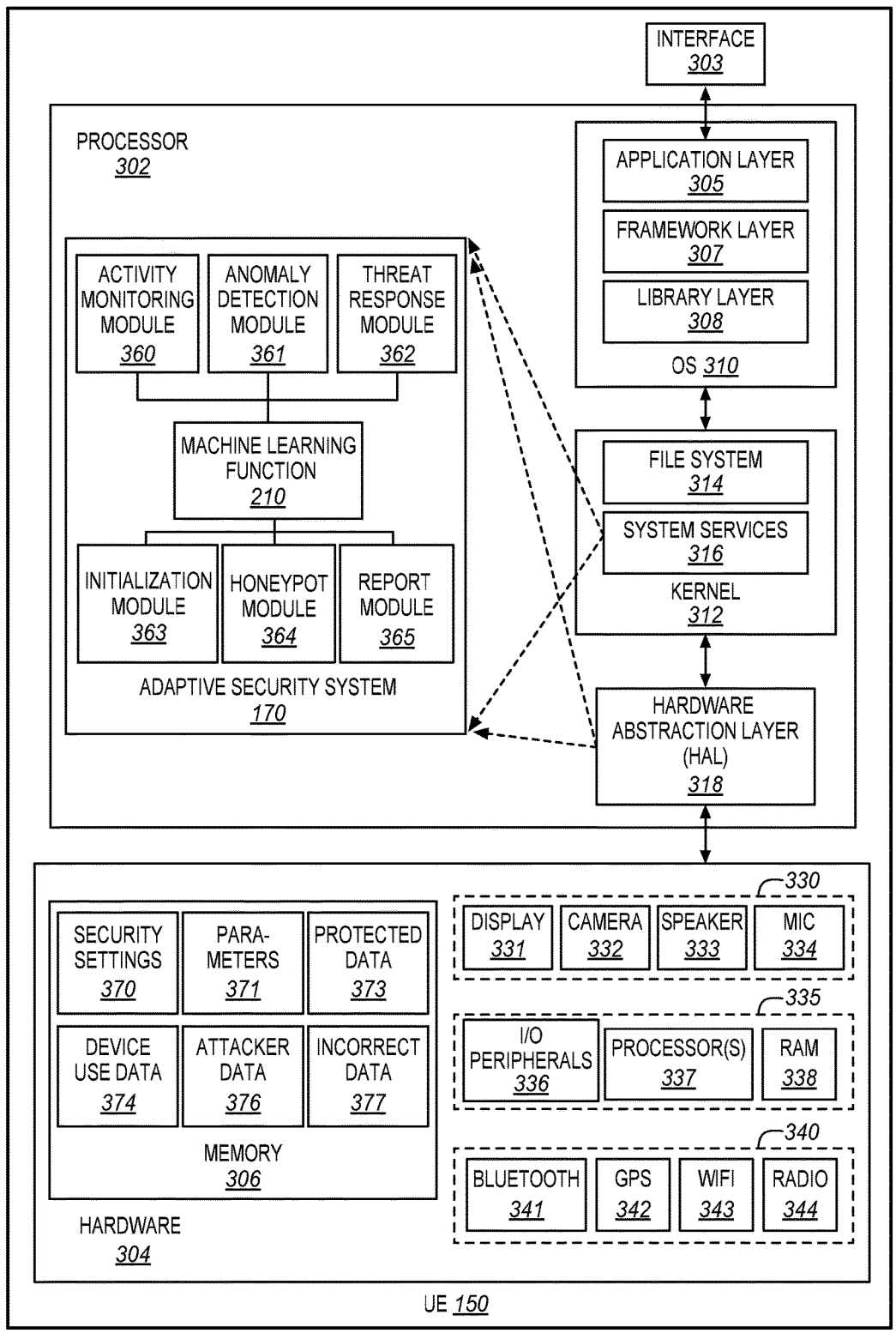
FIG. 3 is a block diagram of user equipment enhanced with an adaptive security system in an exemplary embodiment.

FIG. 3 is a block diagram of the UE 150 enhanced with the adaptive security system 170 in an exemplary embodiment. The UE 150 may include a user device such as a laptop or smartphone, an edge device 108 such as a router or network element, or any other device managed by the administration system 110 of the enterprise network 102. The UE 150 includes one or more processor(s) 302 configured to process computer-executable instructions to control the operation of the UE 150 and to implement embodiments of the techniques described herein. The processor 302 interacts with various subsystems of the UE 150 including the hardware 304. The hardware 304 includes memory 306, embedded hardware components 330, processing input components 335, and network components 340. In this example, the hardware components 330 include a display 331 operable to receive touch screen input, a camera 332 operable to capture images and video, a speaker 333 operable to project sound, and a microphone 334 operable to capture sound. The processing input components 335 include Input/Output (I/O) peripherals 336 such as keyboards and external storage devices, one or more processor(s) 337, and random access memory (RAM) 338. Exemplary network components 340 include communication components for Bluetooth 341, global positioning satellite (GPS) 342, WiFi 343, and radio 344.

The UE 150 is enhanced with the adaptive security system 170 that includes the MLF 210 coupled with modules 360-365. More particularly, the adaptive security system 170 includes an activity monitoring module 360, an anomaly detection module 361, a threat response module 362, an initialization module 363, a honeypot module 364, and a report module 365. Each of the modules 360-365 may be implemented in any combination of hardware, firmware, and software and may interface with, or be implemented in, the MLF 210 to perform machine learning techniques for detecting and responding to security threats. Components of the adaptive security system 170 and/or MLF 210 may be implemented within parts of the operating system (OS) 310, the kernel 312 of the OS 310 (e.g., in protected area of memory 306 on top of kernel 312 of the OS 310, a hardware abstraction layer (HAL) 318, within separate programs or applications, in specialized hardware buffers or processors, or any combination thereof. Additionally, it is contemplated that the components of the adaptive security system 170 and/or MLF 210 may be stored in memory 306 for use by the processor 302 or temporarily loaded in RAM 338 for use by the processor 302.

Generally, the OS 310 includes an application layer 305 which may include native and user-installed applications, a framework layer 307 which may include services, managers, and runtime environments, and a library layer 308 which may include system libraries and other user libraries. A user may interact with the OS 310 through an interface 303 such as a graphical user interface (GUI) that presents menus, buttons, and selectable control items to control and use applications running on the OS 310. The HAL 318 is a layer between the OS 310 and the hardware layer and serves for adjusting the OS 310 to different processor architectures. The OS 310 may include the HAL 318 in the kernel 312 or in the form of device drivers that provide a consistent interface for applications to interact with the hardware peripherals. Alternatively or additionally, the HAL 318 may coordinate application programming interfaces (APIs) at various levels of the UE 150 to monitor/observe system events, state changes, etc. As such, the OS 310 and/or the HAL 318 may provide various security settings for the UE 150 that authorize applications or actions for accessing hardware or resources of the UE 150.

The modules 360-365 may modify operations of the OS 310 and/or the HAL 318 to adapt security settings for the UE 150. For instance, the activity monitoring module 360 may monitor various internal services and activities of the OS 310 occurring on the UE 150 such as a change in the types of Input/Output (I/O) requests directed at memory 306, a change in how often files of the file system 314 are accessed, modified, renamed, etc. The activity monitoring module 360 may detect changes in the communication requests received via system services 316 on internal data pathways to record various exchange instructions, messages, or events with the subsystems of the UE 150 occurring via the OS 310 and/or HAL 318. The activity monitoring module 360 may interact with the MLF 210 to obtain learned characteristics, to determine whether to reduce or increase the number of resources being monitored, or to determine whether to change the resources being monitored. The activity monitoring module 360 may also store the recorded information as device use data 374 in memory 306.

The anomaly detection module 361 is configured to determine whether the UE 150 device exhibits anomalous behavior. The anomaly detection module 361 may interact with the MLF 210 to obtain a characteristic of a security threat from anomalous use information, such as a threat level, type, classification. Alternatively or additionally, the anomaly detection module 361 may generate attacker data 376 that identifies or predicts information about a security threat such as an identity or action of an attack. The threat response module 362 is configured to select a plan of action for a particular type of anomalous behavior or security threat. The initialization module 363 is configured to apply security settings 370, parameters 371, or other policies, rules, or user settings as parameters for performing operations with the MLF 210. The honeypot module 364 is configured to prevent or interfere with user requests or actions. The honeypot module 364 may use the HAL 318 to implement protected data 373 to hide sensitive information and/or to generate/provide incorrect data 377 that diverts a malicious request for data to an incorrect data set. The report module 365 may implement machine-to-machine communication or automatic message exchanges to send the device use data 374 and/or attacker data 376 to a remote server 130, the administration system 110, or a peer UE 150 for external detection/response to security threats. Additional details of the operations of modules 360-365 to perform machine learning techniques tailored to the UE 150 to detect security threats and trigger an automatic series of actions are discussed below.

Figure 4:
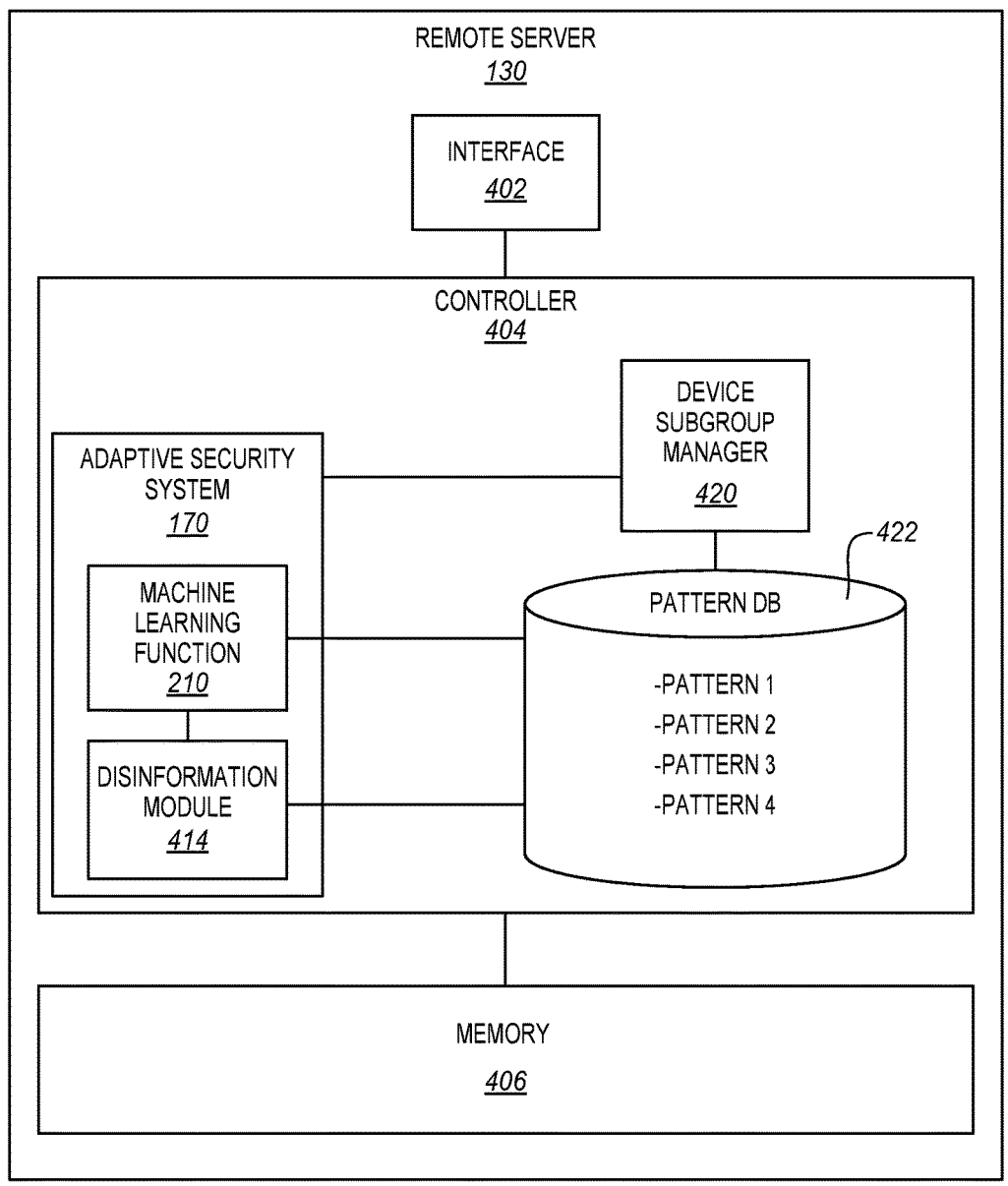
FIG. 4 is a block diagram of a remote server enhanced with an adaptive security system in an exemplary embodiment.

FIG. 4 is a block diagram of the remote server 130 enhanced with the adaptive security system 170 in an exemplary embodiment. The remote server 130 includes an interface component 402 configured to communicate with the UE 150 and/or the administration system 110 over one or more external networks 124, one or more controllers 404, and a memory 406. The controller 404 represents the internal circuitry, logic, hardware, etc., that provides the functions of the remote server 130. The memory 406 is a computer readable storage medium for data, instructions, applications, etc., and is accessible by controller 404. The remote server 130 may include various other components not specifically illustrated in FIG. 4.

The controller 404 implements the adaptive security system 170 including the MLF 210 and a disinformation module 414. The disinformation module 414 be implemented in any combination of hardware, firmware, and software and may interface with, or be implemented in, the MLF 210 to perform machine learning techniques for detecting and/or responding to security threats The controller 404 also implements a device subgroup manager 420 configured to manage security features remotely over the external network 124 for one or more of the UE 150 grouped by a common characteristic such as a location, region, network, department, user group, or worksite associated with the enterprise. Subgroups of the UE 150 may also be based on a common type of device, model, platform, hardware, security attributes, or usage that is common. The device subgroup manager 420 may input device behavior information from the UE 150 into the MLF 210 to establish anomalous device use data and other security event data from the population of the UE 150 in a pattern database 422. The pattern database 422 may be used to train the MLF 210 to identify patterns and adapt recommendations on control of the UE 150 for a particular type of security threat. For instance, the disinformation module 414 may use the MLF 210 to provide incorrect data 377 to the UE 150 according to patterns in the pattern database 422. Additionally, the adaptive security system 170 adapted to perform functions on behalf of the administration system 110 and/or one of the UE 150. For instance, a regional security manager may authenticate users of the UE 150 and issue commands that revoke privileges, terminate applications, or otherwise disable functions on the UE 150 which have been compromised or stolen. Thus, in the remote server 130, the adaptive security system 170 may change the characteristics or patterns it looks for in data and/or how it classifies/responds to input based on a subgroup characteristic of the UE 150.

Figure 5:
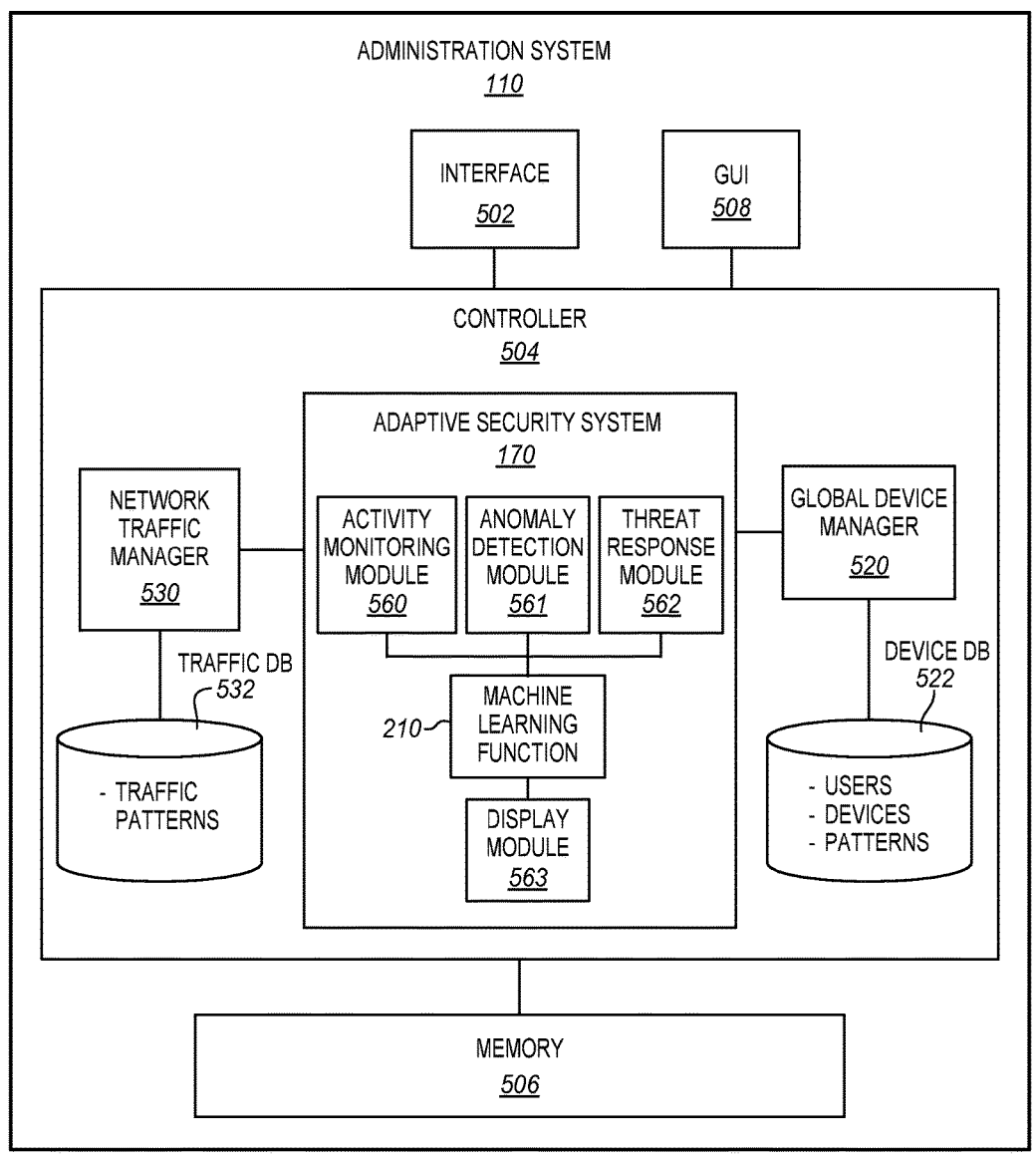
FIG. 5 is a block diagram of an administration server enhanced with an adaptive security system in an exemplary embodiment.

FIG. 5 is a block diagram of the administration system 110 enhanced with the adaptive security system 170 in an exemplary embodiment. The administration system 110 includes an interface component 502 configured to communicate with the UE 150 and/or the administration system 110 over one or more internal networks such as enterprise network 102 and/or one or more external networks 124. The administration system 110 also includes a graphical user interface (GUI) 508 configured to display intrusion event sequences. The administration system 110 further includes one or more controllers 504, and a memory 506. The controller 504 represents the internal circuitry, logic, hardware, etc., that provides the functions of the administration system 110. The memory 506 is a computer readable storage medium for data, instructions, applications, etc., and is accessible by controller 504. The administration system 110 may include various other components not specifically illustrated in FIG. 5.

The controller 504 implements the adaptive security system 170 including the MLF 210 and one or more modules 560-563 including an activity monitoring module 560, an anomaly detection module 561, a threat response module 562, and a display module 563. Each of the modules 560-563 may be implemented in any combination of hardware, firmware, and software and may interface with, or be implemented in, the MLF 210 to perform machine learning techniques for detecting and responding to security threats. The controller 504 also implements a global device manager 520 that manages system-wide security policies for devices that operate within or interact with the enterprise network 102, such as the edge devices 108 and the UE 150. Moreover, the administration system 110 may include or be coupled with a device database 522 that maintains user, device, and pattern information for the UEs 150 which may be distributed/retrieved by an authorized UE 150 or remote server 130 and applied to machine learning to tailor the security of the enterprise network environment 100 to the particular needs of the end-user of the UE 150 or enterprise.

The administration system 110 also includes a network traffic manager 530 configured to route anomalous traffic detected at the edge devices 108 to the MLF 210 to establish traffic patterns in a traffic database 532. Anomalous traffic information obtained from the edge devices 108 and anomalous device use information obtained from the UE 150 may be aggregated at the administration system 110 and applied to the MLF 210 to detect vulnerabilities of the enterprise and refine policies of the global security manager 114. Numerous configurations of the administration system 110, the remote server 130, and the UE 150 are possible. For instance, the administration system 110 and/or the remote server(s) 130 may independently or cooperatively implement cloud functionality or a cluster of servers/computers that perform the same or similar set of functions described but in a distributed manner. Additionally, through the modules (e.g., modules 360-365 of the UE, the disinformation module 414 of the remote server, and modules 560-563 of the administration system 110) are described as performing various operations, such modules are merely examples and the same or similar functionality may be performed by a greater or lesser number of modules, and may be implemented to perform similar functionality on various platforms (e.g., a peer UE 150, the remote server 130, the administration system 110, etc.) as discussed below.

Figure 6:
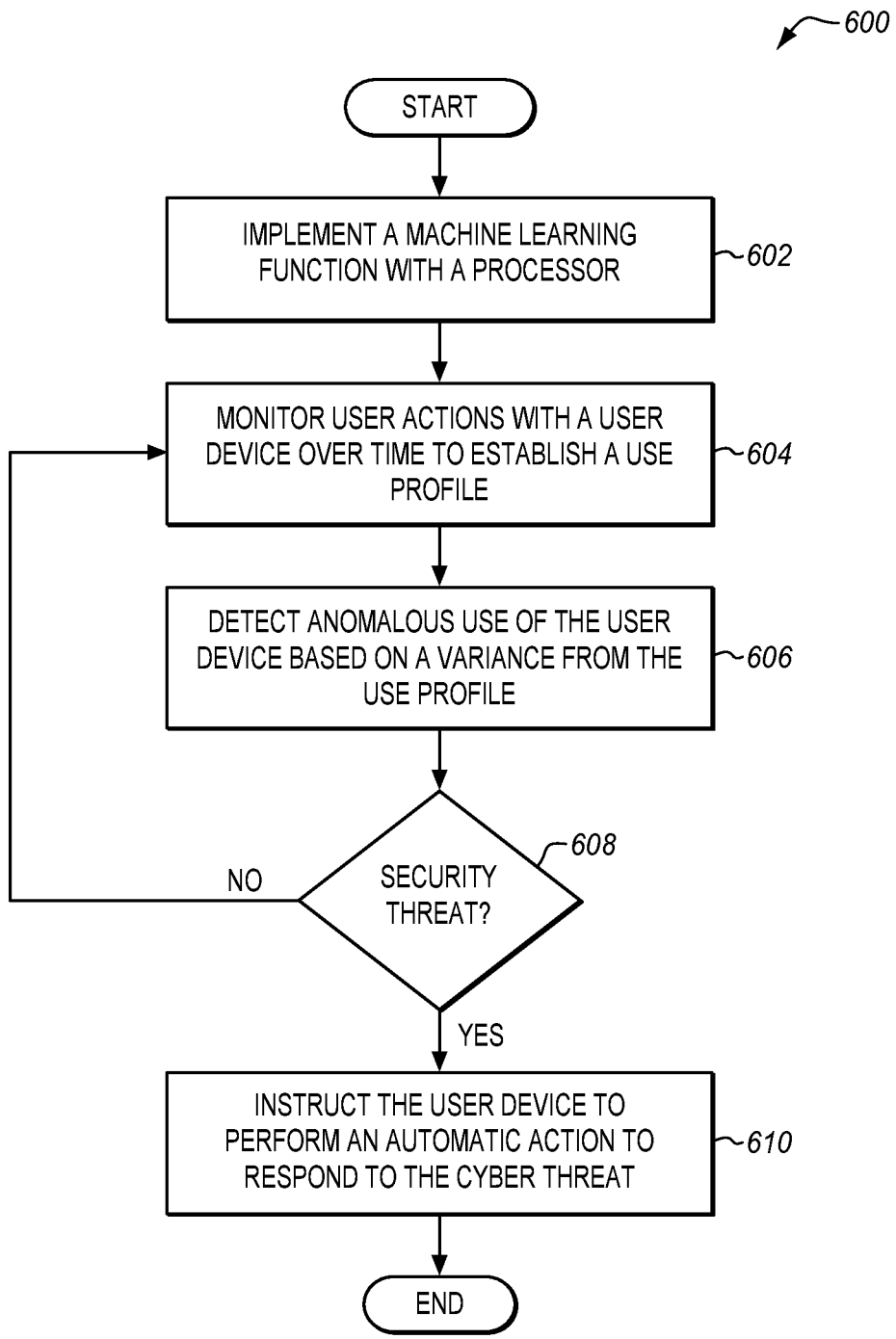
FIG. 6 is a flowchart illustrating a method of detecting and responding to a security threat in an exemplary embodiment.

FIG. 6 is a flowchart illustrating a method of detecting and responding to a security threat in an exemplary embodiment. The method 600 will be described with respect to the enterprise network environment 100 of FIG. 1, although one skilled in the art will recognize that methods described herein may be performed by other devices or systems not shown. The steps of the method 600 may be performed by one or more of the UE 150, one or more of the remote servers 130, the administration system 110, or some combination thereof. The steps of the methods described herein are not all inclusive and may include other steps not shown. The steps may also be performed in an alternate order.

Initially, the administration system 110 may define security policies to distribute to the remote servers 130 and the UE 150 under its domain. Security personnel of the administration system 110 or user of the UE 150 may provide custom security policies to target a particular one or group of the UE 150, users, threat types, machine responses, etc.

In step 602, a processor (e.g., processor 302 of the UE 150, controller 404 of the remote server 130, and/or, controller 504 of the administration system 110) implements the MLF 210. That is, the MLF 210 may be used to perform machine learning techniques in any of the steps/flowcharts described herein. Though steps of the flowcharts herein generally refer to the adaptive security system 170, it is understood that the adaptive security system 170 and the MLF 210 may perform actions at UE 150, the remote server 130, and/or the administration system 110 in various combinations. That is, machine learning may be applied in each step of a method and performed by the UE 150, the remote server 130, and/or the administration system 110 in various combinations as described in further detail below.

The MLF 210 may implement any number of suitable machine learning processes, algorithms, or techniques including anomaly detection, Naive Bayes classifiers, support vector machines, decision tree learning, neural network learning, reinforcement learning, etc. The machine learning processes may be tailored with machine learning parameters by matter of design choice (e.g., kernel type for support vector machines, number of trees for decision trees, etc.). The MLF 210 may transform the input values to determine patterns, correlations, features, statistics, predictions, or classifications.

In step 604, the adaptive security system 170 monitors user actions with the UE 150 over time to establish a use profile. At the UE 150, the activity monitoring module 260 may monitor the UE 150 and record the device use data 374 in memory 306. For instance, the UE 150 may monitor and/or record user behavior (e.g., keystrokes, gestures, speech, motion, location, etc.), system operations (e.g., notification alerts, application requests for a system resource, processor interrupts, etc.), personal information of the user 152 (e.g., contact information, calendar information, etc.), content received from another source (e.g., a phone call, a download, a website access, etc.) and/or stored on the UE 150 (e.g., audio data captured from the microphone 334, image or video data captured from the camera 332).

The report module 365 may send the device use data 374 to the remote server 130 and/or the administration system 110 at particular intervals, in response to being triggered remotely by the remote server 130 and/or the administration system 110, and/or in response to being triggered in response to an event detected in the enterprise network environment 100. The historical use patterns associated with the UE 150 may be stored at the UE 150, the remote server 130, and/or the administration system 110.

Furthermore, the UE 150 may store (e.g., in memory 306) or be associated with (e.g., in device database 522 of the administration system 110) predefined characteristics and/or learned characteristics that trigger the UE 150 to record data related to use of the UE 150. That is, predefined characteristics and/or learned characteristics may identify a combination of events, types of data, locations, or particular points of time for which the UE 150 may be subject to anomalous use for accurate monitoring and/or recording of device use data. Exemplary triggers include a location or direction of travel of the UE 150 (e.g., in relation to a known or projected location obtained from calendar information or an external data source), an authority of the user 152 to use particular data or features of the UE 150 (e.g., in relation to a time or work project for which the user is authorized), or behavior of the user 152 over a period of time (e.g., in relation to an exceeded threshold different from an established behavior pattern during a similar period of time, time of day, etc.).

Such trigger policy information may be provided to the UE 150 by the administration system 110 and/or the remote server 130.

In step 606, the adaptive security system 170 detects anomalous use of the UE 150 based on a variance from the use profile. The anomalous use may be analyzed by MLF 210 on any of the UE 150, the remote server 130, and/or the administration system 110 to detect the anomalous use. The analysis may occur in real-time or may occur at a later point in time (e.g., at predefined periods of time, after the UE 150 is back in range or reconnected to a compatible device/system, etc.). As discussed above, the MLF 210 may evolve/update over time without predefined instruction. Thus, detection of the anomalous use may be specific to the UE 150 relative to its device signature or use profile associated with the UE 150.

In step 608, the adaptive security system 170 determines whether the anomalous use is representative of a security threat. The adaptive security system 170 may determine a characteristic of a cyber threat from an output of the MLF 210. That is, after using the anomalous use information to train one or more of the MLF 210 over time, the machine learning result that is output may, for example, be used to classify a type of cyber threat, predict a likelihood of a future cyber threat action, or determine that a threshold rate of change in the data correlates with a particular type of security vulnerability of the UE 150. In some embodiments, the MLF 210 output may predict or expose previously unascertained details data related to the anomalous use such as the tactics, techniques, or procedures used by an attacker. Moreover, the MLF 210 output may identify or predict indicators or data resources left behind as a result of a cyber attack such as Internet Protocol (IP) addresses of servers used to orchestrate the attack or hashes or registry keys of files used in the attack.

In step 610, the adaptive security system 170 instructs the UE 150 to perform one or more automatic actions to respond to the security threat. That is, the threat response module 362 may select one or more actions to perform via an output from the MLF 210. Alternatively or additionally, the UE 150 may receive an output from the MLF 210 or instruction from the remote server 130 and/or the administration system 110 as an automatically executable instruction. The automatic actions are described in further detail below.

FIG. 7-10 are flowcharts illustrating methods for automatically responding to security threats in exemplary embodiments. The methods will be described with respect to the enterprise network environment 100 of FIG. 1, although one skilled in the art will recognize that methods described herein may be performed by other devices or systems not shown. The steps of the methods may be performed by one or more of the UE 150, one or more of the remote servers 130, the administration system 110, or some combination thereof. The steps of the methods described herein are not all inclusive and may include other steps not shown. The steps may also be performed in an alternate order.

Figure 7:
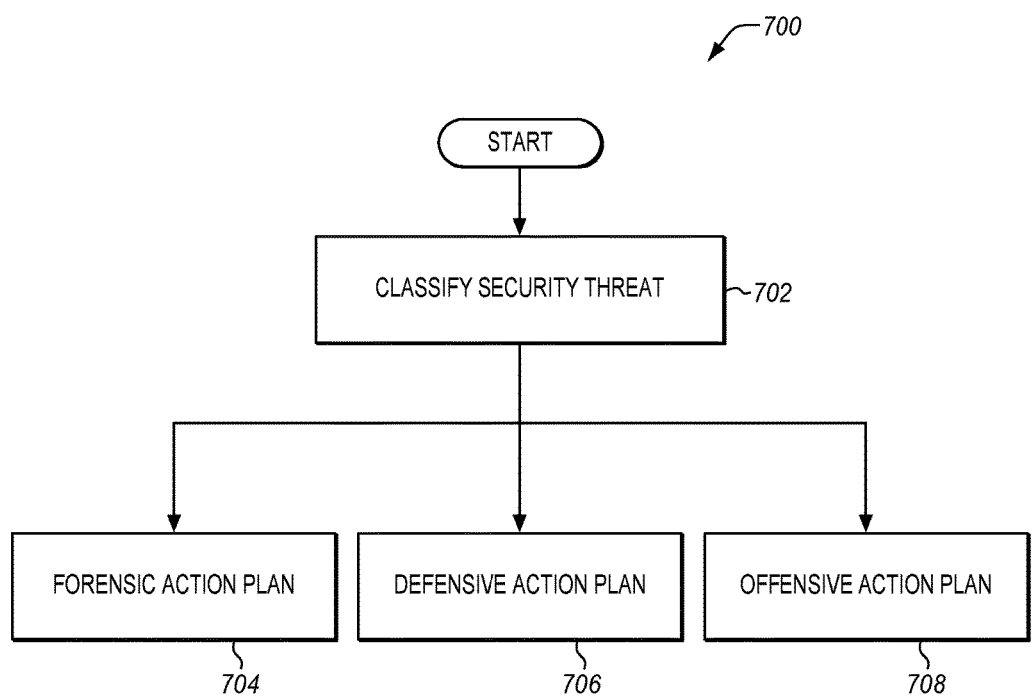
FIG. 7-10 are flowcharts illustrating methods for automatically responding to security threat in exemplary embodiments.

FIG. 7 illustrates a method 700 for determining an automatic action to perform to respond to a security threat. The steps of method 700 may be performed as part of step 610 described above. In step 702, the adaptive security system 170 classifies the security threat. The classification of the security threat my trigger the UE 150 to perform one or a sequence of actions as part of a forensic action plan 704, a defensive action plan 706, and/or an offensive action plan 708. For example, a locus of suspicious events at a particular time, for a particular device/user/worksite, or of a particular type may trigger a specific sequence of actions. Moreover, the actions determined by the MLF 210 of the adaptive security system 170 may be specific to a certain UE 150, its parameters, security settings, learned characteristics, etc.

The forensic action plan 704 may include monitoring a target resource of the UE 150 such as a particular application, file, or hardware component and/or authenticating the UE 150 using predefined or learned characteristics. The defensive action plan 706 may include hiding sensitive data or files, restricting access or permission of an application or user, and collecting additional information of an ongoing attack to identify attackers or establish attacker identity profiles. The offensive action plan 708 may include destroying sensitive data or files, providing disinformation or incorrect data sets in response to a request to access sensitive data of files, spoofing a wireless network using a hotspot to mine data from devices in range, jamming wireless and cellular signals, and limiting the performance or restrict the capability of the UE 150 so that a larger volume of data can be mined for the ongoing attack (e.g., log keystrokes, camera images/video, microphone audio, etc.).

Figure 8:
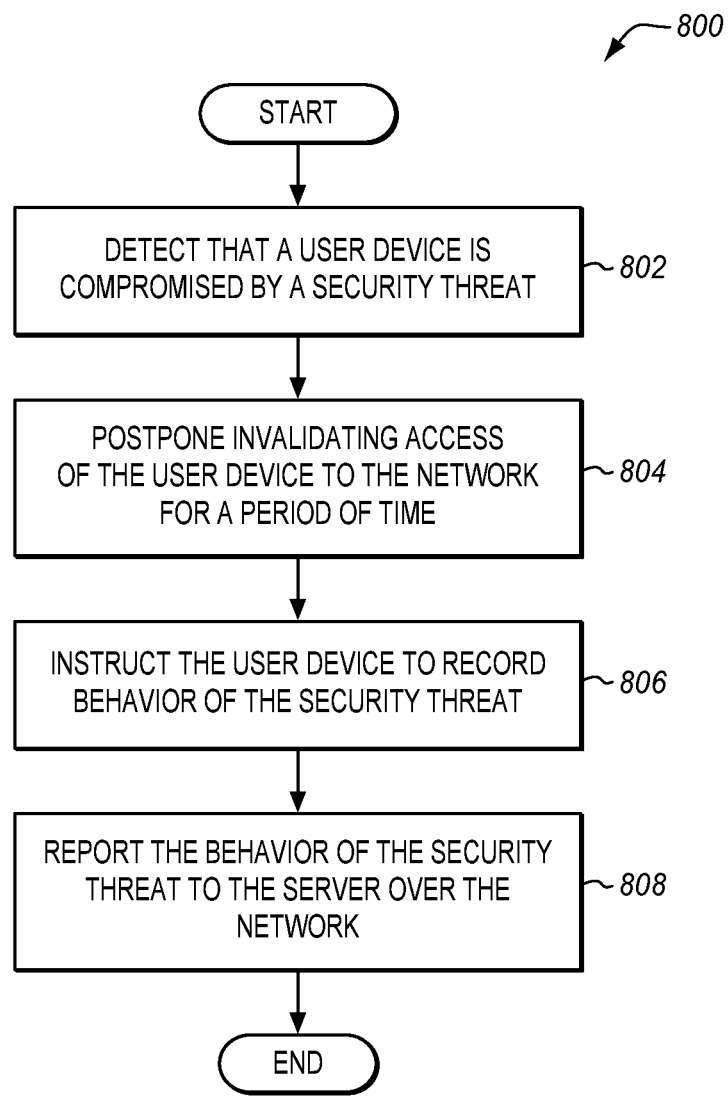

FIG. 8 illustrates a method 800 for implementing an exemplary forensic action plan 704. In step 802, the adaptive security system 170 detects that the UE 150 is compromised by a security threat. The administration system 110 may detect that the UE 150 is compromised by a security threat via its own MLF 210 or in response to message relayed from the MLF 210 of the UE 150 and/or remote server 130. In step 804, the adaptive security system 170 postpones invalidating access of the UE 150 to the enterprise network 102 for a period of time. In step 806, the adaptive security system 170 instructs the user device to record behavior of the security threat. In step 808, the UE 150 reports the behavior of the security threat to the administration system 110. Thus, if the UE 150 is compromised or stolen, the administration system 110 may use the UE 150 to collect information about its attacker rather than excluding it as part of the enterprise.

The UE 150 may monitor and/or record attacker behavior (e.g., keystrokes, gestures, speech, motion, location, etc.), system operations (e.g., notification alerts, application requests for a system resource, processor interrupts, etc.), personal information resources (e.g., contact information, calendar information, etc.), content received from another source (e.g., a phone call, a download, a website access, etc.) and/or stored on the UE 150 (e.g., audio data captured from the microphone 334, image or video data captured from the camera 332, etc.). In one embodiment, the adaptive security system 170 instructs the UE 150 to activate at least one of the hardware components 330 (e.g., the microphone 334, the camera 332, one of the network components 340, etc.), and to record the behavior of the security threat by monitoring the hardware components 330. The administration system 110 may receive and analyze the behavior of the security threat to profile attack patterns for the UEs 150 under its management as discussed in further detail below.

Figure 9:
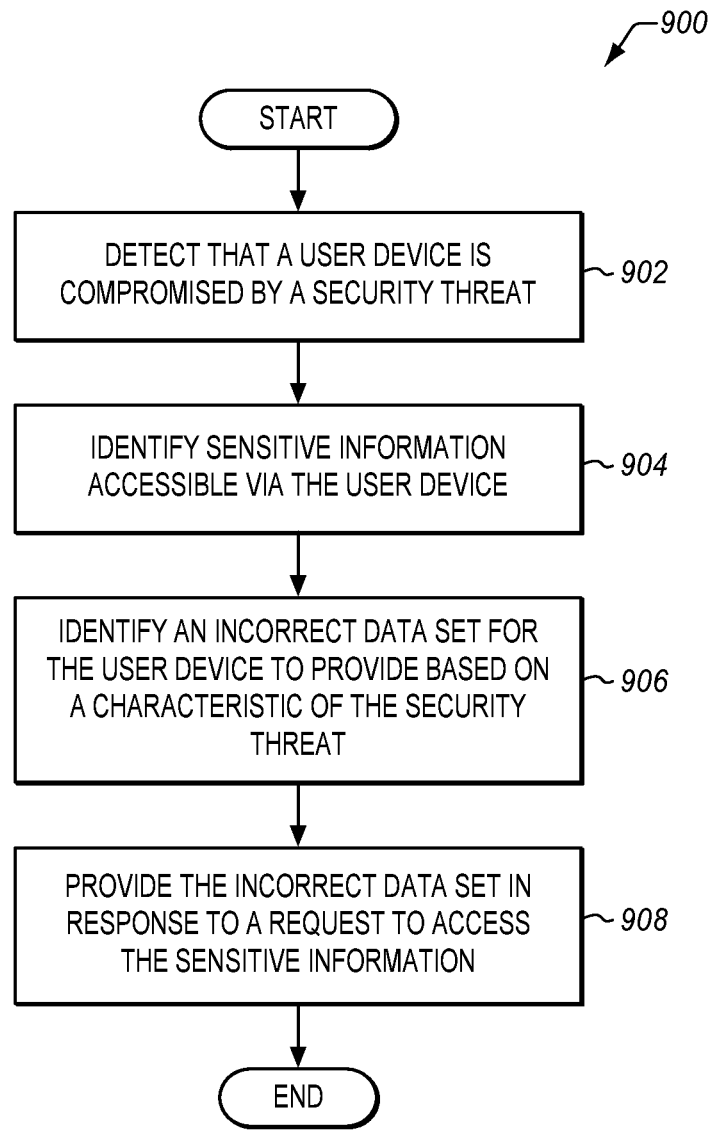

FIG. 9 illustrates a method 900 for implementing an exemplary offensive action plan 708. In step 902, the adaptive security system 170 detects that the UE 150 is compromised by a security threat. In step 904, the adaptive security system 170 identifies sensitive information accessible via the UE 150. For example, policy information or rules identifying sensitive information may be provided from the administration system 110 to the UE 150 and stored as protected data 373 in memory 306 of the UE 150. In step 906, the adaptive security system 170 identifies an incorrect data set for the UE 150 to provide based on a characteristic of the security threat. For example, the honeypot module 364 of the UE 150 and/or the disinformation module 414 of the remote server 130 may interact with the MLF 210 to generate, select, and/or provide the incorrect data 377 to memory 306 of the UE 150. Then, in step 908, the UE 150 provides the incorrect data 377 in response to a request to access the sensitive information.

Figure 10:
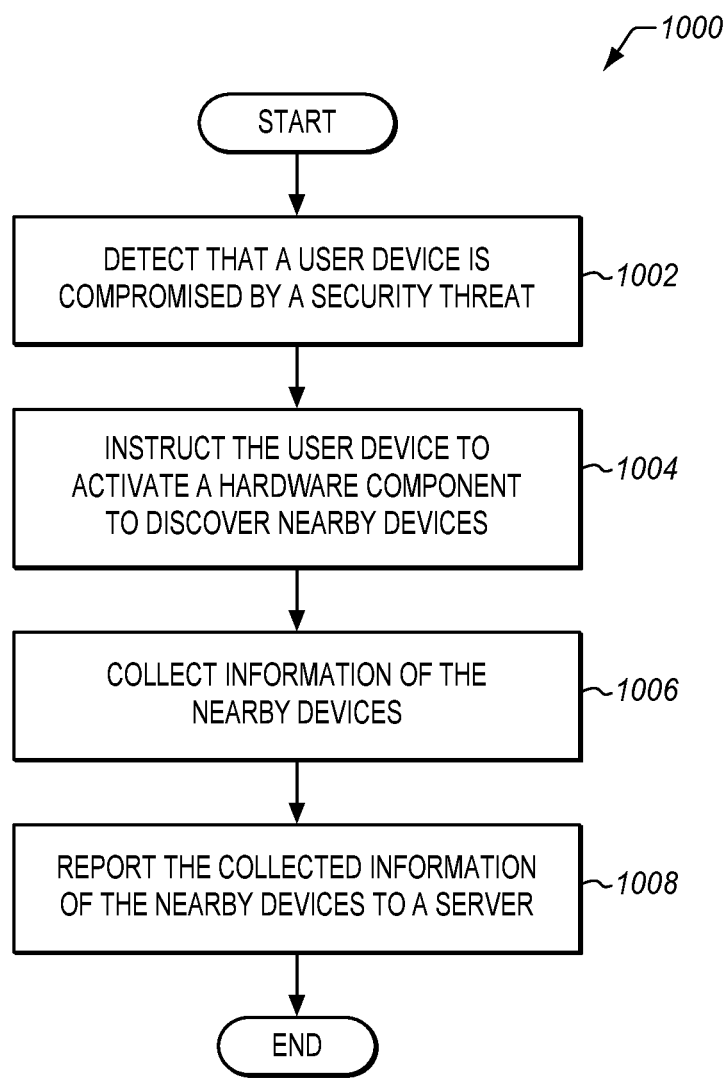

FIG. 10 illustrates a method 1000 for implementing another exemplary offensive action plan 708. In step 1002, the adaptive security system 170 detects that the UE 150 is compromised by a security threat. In step 1004, the adaptive security system 170 instructs the UE 150 to activate a hardware component to discover nearby devices. For example, the MLF 210 may output an instruction to the UE 150 to activate WiFi 343 to spoof a wireless network using a hotspot or to activate Bluetooth 341 to discover or connect with nearby devices. In step 1006, the activity monitoring module 360/560 may monitor and record data related to message exchanges with the hardware component to collect information of the nearby devices. In step 1008, the UE 150 reports the collected information of the nearby devices to the administration system 110 (e.g., a management server including global device manager 520).

Figure 11:
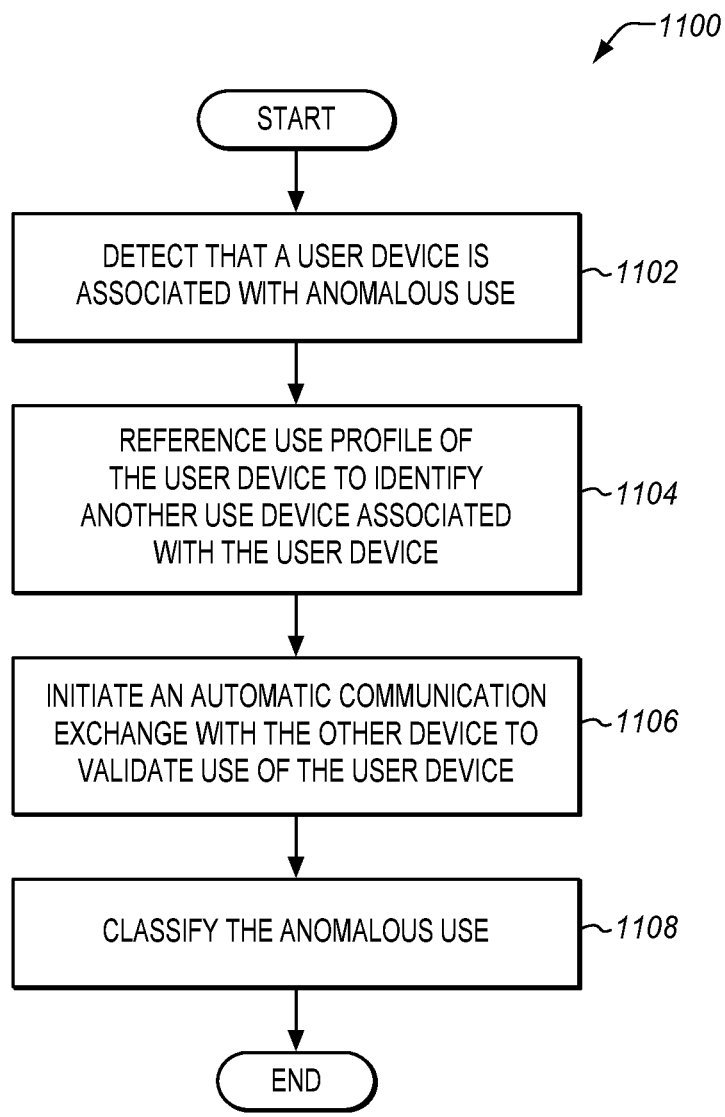
FIG. 11 is a flowchart illustrating a method for determining whether anomalous is indicative of a security threat in an exemplary embodiment.

FIG. 11 is a flowchart illustrating a method 1100 for determining whether anomalous is indicative of a security threat in an exemplary embodiment. In step 1102, the adaptive security system 170 detects that the UE 150 is associated with anomalous use. In one embodiment, detection of the anomalous use may occur at the UE 150, a peer of the UE 150 (e.g., another user device managed by the administration system 110), the remote server 130, or the administration system 110.

In step 1104, the adaptive security system 170 references the use profile of the UE 150 to identify a peer UE 150 associated with the UE 150. In step 1106, the adaptive security system 170 initiates an automatic communication exchange with the other device to validate use of the UE 150. For instance, the remote server 130 or the administration system 110 may authenticate a user of a mobile device by issuing a command to that user's laptop (or smart wearable, smart automotive system, etc.) to turn on its microphone, validate the user's voice, and report a result of the validation. In doing so, the remote server 130 or the administration system 110 may reference learned characteristics of multiple UE 150 (e.g., in memory 306 as device use data 374, in device database 522 of administration system 110, etc.) which are associated with a same user and/or which are commonly connected with one another or in range of connection, sound of speaker 333, in view of the camera 332, etc. as established by the learned device use. The learned characteristics may also include timing information associated with device proximity such that the remote server 130 or the administration system 110 may issue timely commands to accurately ascertain the status of the UE 150 via its peer. Thus, the UE 150 may collaborate with its peer UE 150, remote servers 130, and/or the administration system 110 to enable accurate detection and precise response to a security threat. Then, in step 1108, the adaptive security system 170 classifies the anomalous use to determine whether it is a security threat. If it is, the remote server 130 or the administration system 110 may reference the device database 522 to identify characteristics which may inform action decisions to respond to the security threat. If not, the adaptive security system 170 may authorize the use and use it as a training example to adapt the MLF 210 and the anomaly detection module 361/561.

Figure 12:
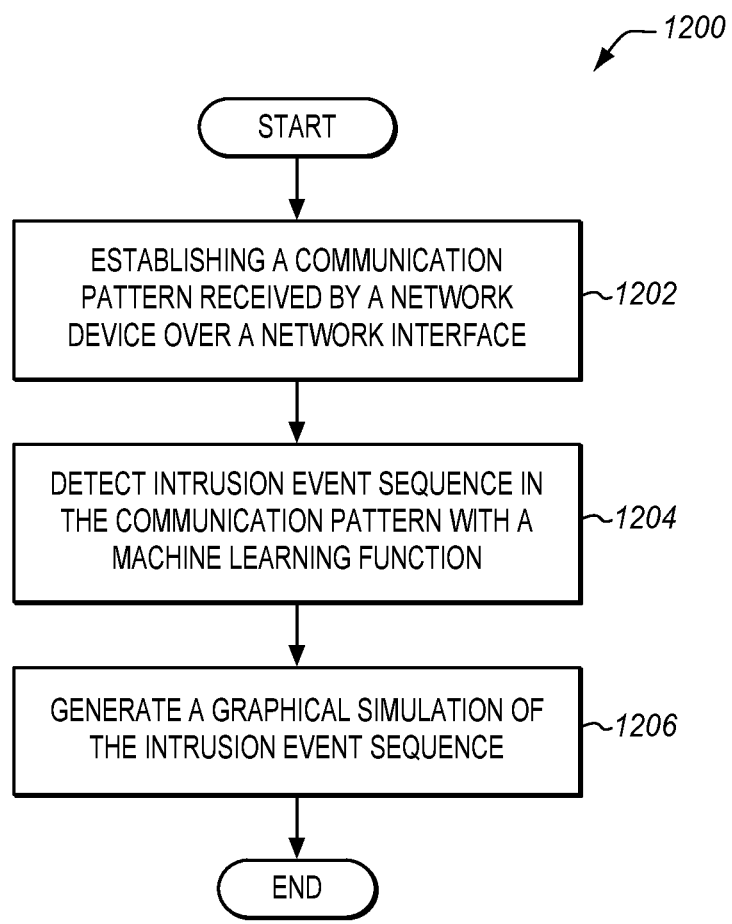
FIG. 12 is a flowchart illustrating a method for deriving a graphical intrusion event sequence in an exemplary embodiment.

FIG. 12 is a flowchart illustrating a method 1200 for deriving a graphical intrusion event sequence in an exemplary embodiment. In step 1202, the network traffic manager 530 of the administration system 110 interacts with the MLF 210 to establish a communication pattern received by a network device (e.g., edge device 108) over a network interface. In one embodiment, the activity monitoring module 360 of the edge device 108 may detect/provide the pattern to the network traffic manager 530. In step 1204, the adaptive security system 170 detects an intrusion event sequence in the communication pattern via the MLF 210. For instance, the MLF 210 may analyze packet headers, frames, IP addresses, forwarding tables, or transmission routes (number of hops) between packets at a server of the enterprise network 102 and determine whether past activity (established as normal activity) is different from current activity. In step 1206, the adaptive security system 170 generates a graphical simulation of the intrusion event sequence. For example, the display module 563 may derive an intrusion event sequence for one or multiple UE 150, filter events by intrusion patterns, user, location, etc., and provide a step-by-step playback of intrusion events to the GUI 508.

Figure 13:
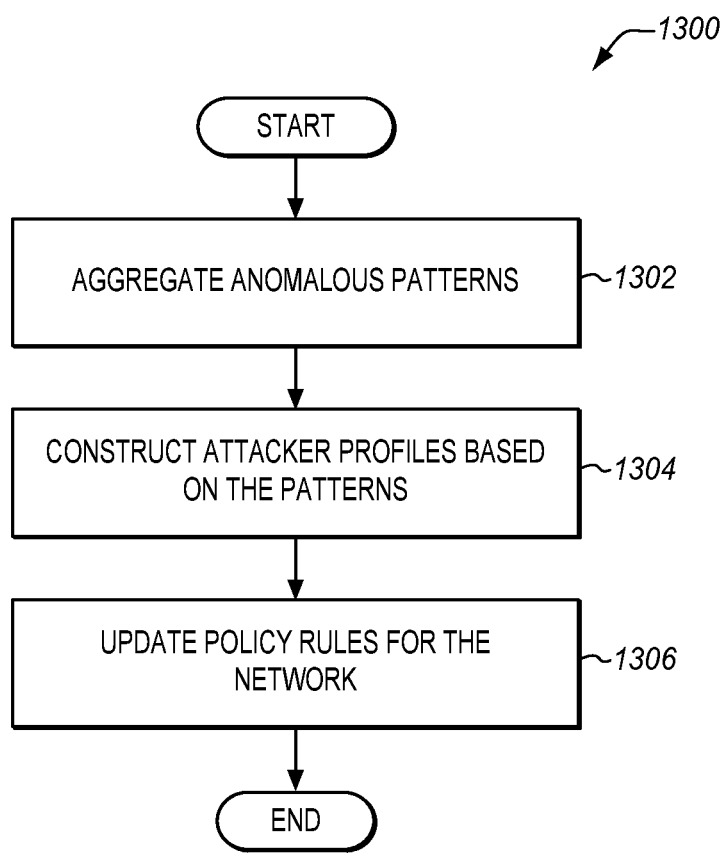
FIG. 13 is a flowchart illustrating a method for updating security policies of an enterprise network environment in an exemplary embodiment.

FIG. 13 is a flowchart 1300 illustrating a method for updating security policies of an enterprise network environment 100 in an exemplary embodiment. In step 1302, the adaptive security system 170 aggregates patterns. The network traffic manager 530 may forward traffic patterns to the traffic database 532 and the global device manager 520 may forward device use patterns to the device database 522. In step 1304, the adaptive security system 170 constructs attacker profiles based on the patterns. Then, in step 1306, the adaptive security system 170 updates policy rules for the enterprise network 102. For example, if attacks have been found to target specific areas of the enterprise network 102, the specific areas can become high priority checkpoints for more intensive/frequent monitoring by the activity monitoring module 560.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A system comprising:
a server configured to manage cyber security for a plurality of user devices belonging to an enterprise; and
a user device comprising:
an interface component configured to communicate with the server over a network;
a hardware processor that implements a machine learning function configured to monitor user interactions with the user device over time to establish a use profile, to detect anomalous use of the user device based on a variance from the use profile, to input the anomalous use into the machine learning function to determine that the anomalous use is representative of a security threat to the enterprise, to control the user device to automatically initiate recording behavior of the security threat in memory based on an output of the machine learning function, and to report the behavior of the security threat to the server via the interface; and
another user device managed by the server that is associated with the user device,
wherein the machine learning function is configured, in response to detecting the anomalous use of the user device, to send an instruction to the another user device to validate whether an authorized user is in proximity of the another user device, and
wherein the server is configured to analyze the behavior of the security threat to profile attack patterns for the user devices belonging to the enterprise.

2. The system of claim 1 wherein:
the server is configured to detect that the user device is compromised by the security threat, and to postpone invalidating communication of the user device to the server via the network for a period of time; and
the machine learning function operating on the user device is configured to record and report the behavior of the security threat to the server over the network via the interface component during the period of time.

3. The system of claim 1 wherein:
the behavior of the security threat includes one or more of keystroke data, audio data, image data, application use data, or file access request data.

4. The system of claim 1 wherein:
the machine learning function is configured to restrict capability of the user device to enable increased amounts of data collection related to the behavior of the security threat.

5. The system of claim 1 wherein:
the machine learning function is configured to instruct the user device to activate at least one hardware component including one of a microphone, a camera, and a network interface component, and to record the behavior of the security threat by monitoring the at least one hardware component.

6. The system of claim 1 wherein:
the user device includes a wireless interface component; and
the machine learning function is configured to instruct the user device to activate the wireless interface component to spoof a wireless network, to collect information of a wireless device that connects to the wireless network, and to report the information of the wireless device to the server over the network.

7. The system of claim 1 wherein:
the machine learning function is configured to identify sensitive information stored in memory of the user device that is susceptible to the security threat, to identify an incorrect data set in the memory of the user device that is associated with the sensitive information, and to provide the incorrect data set in response to a request to access the sensitive information.

8. The system of claim 7 further comprising:
a remote server that implements a machine learning system configured to receive information regarding the behavior of the security threat, and to provide the incorrect data set for the user device based on a characteristic of the security threat output from the machine learning system.

9. The system of claim 1 wherein:
the hardware processor implements the machine learning function in one of a protected memory on top of an operating system kernel of the user device, or a hardware abstraction layer of the user device.

10. A method comprising:
communicating, via an interface component of a user device, with a server that manages cyber security for a plurality of user devices belonging to an enterprise;
implementing a machine learning function with a processor of the user device;
monitoring user interactions with the user device over time to establish a use profile;
detecting anomalous use of the user device based on a variance from the use profile;
identifying another user device managed by the server that is associated with the user device;
in response to detecting the anomalous use of the user device, sending an instruction to the another user device to validate whether an authorized user is in proximity of the another user device;
determining the anomalous use is representative of a security threat to the enterprise based on input of the anomalous use into the machine learning function;
controlling the user device to automatically initiate recording behavior of the security threat based on an output of the machine learning function;
reporting the behavior of the security threat to the server; and
analyzing, at the server, the behavior of the security threat to profile attack patterns for the user devices belonging to the enterprise.

11. The method of claim 10 further comprising:
responsive to detecting that the user device is compromised by the security threat, postponing, at the server, an invalidation of communication of the user device to the server via a network for a period of time; and
reporting the behavior of the security threat to the server over the network via the interface component during the period of time.

12. The method of claim 10 wherein further comprising:
the behavior of the security threat includes one or more of keystroke data, audio data, image data, application use data, or file access request data.

13. The method of claim 10 further comprising:
identifying sensitive information stored in memory of the user device that is susceptible to the security threat;
identifying an incorrect data set in the memory of the user device that is associated with the sensitive information; and providing the incorrect data set in response to a request to access the sensitive information.

14. A non-transitory computer readable medium embodying programmed instructions executed by a processor, wherein the instructions direct the processor to:
communicate, via an interface component of a user device, with a server that manages cyber security for a plurality of user devices belonging to an enterprise;
implement a machine learning function with the user device;
monitor user interactions with the user device over time to establish a use profile;
detect anomalous use of the user device based on a variance from the use profile;
identify another user device managed by the server that is associated with the user device;
in response to detecting the anomalous use of the user device, send an instruction to the another user device to validate whether an authorized user is in proximity of the another user device;
determine the anomalous use is representative of a security threat to the enterprise based on input of the anomalous use into the machine learning function;
control the user device to automatically initiate recording behavior of the security threat in memory based on an output of the machine learning function;
report the behavior of the security threat to the server; and
analyze, at the server, the behavior of the security threat to profile attack patterns for the user devices belonging to the enterprise.

15. The computer readable medium of claim 14 wherein the instructions further direct the processor to:
in response to detecting that the user device is compromised by the security threat, postpone, at the server, an invalidation of communication of the user device to the server via a network for a period of time; and
report the behavior of the security threat to the server over the network via the interface component during the period of time.

16. The computer readable medium of claim 14 wherein:
the behavior of the security threat includes one or more of keystroke data, audio data, image data, application use data, or file access request data.

17. The computer readable medium of claim 14 wherein the instructions further direct the processor to:
identify sensitive information stored in memory of the user device that is susceptible to the security threat;
identify an incorrect data set in the memory of the user device that is associated with the sensitive information; and
provide the incorrect data set in response to a request to access the sensitive information.

18. An apparatus comprising:
a hardware processor configured to detect anomalous use of a user device based on historical use of the user device, to identify another user device that is associated with the user device, to send an instruction to the another user device to validate whether an authorized user is in proximity of the another user device in response to detecting the anomalous use of the user device, to input information of the anomalous use into a machine learning function, to determine a characteristic of a cyber threat from an output of the machine learning function, to initiate recording behavior of the cyber threat in memory based on the characteristic, and to report the behavior of the cyber threat to a server that manages cyber security for the user device and other user devices belonging to an enterprise.

19. The apparatus of claim 18 wherein:
the hardware processor is configured, in response to determining that the characteristic of the cyber threat includes a threat to access a type of data via the user device, to instruct the user device to provide disinformation to respond to a request to access the type of data.

20. The apparatus of claim 18 wherein:
the hardware processor is configured, in response to determining that the characteristic of the cyber threat includes a threat to information leakage of data stored in memory of the user device, to instruct the user device to erase the data.

21. The apparatus of claim 18 wherein:
the hardware processor implements the machine learning function in a server that is remote from the user device.

22. A method comprising:
detecting anomalous use of a user device based on historical use of the user device;
identifying another user device that is associated with the user device;
in response to detecting the anomalous use of the user device, sending an instruction to the another user device to validate whether an authorized user is in proximity of the another user device;
inputting information of the anomalous use into a machine learning function;
determining a characteristic of a cyber threat from an output of the machine learning function;
initiate recording behavior of the cyber threat based on the characteristic; and
reporting the behavior of the cyber threat to a server that manages cyber security for the user device and other user devices belonging to an enterprise.

23. The method of claim 22 further comprising:
establishing, with the machine learning function, a communication pattern received by the device over a network interface;
detecting an intrusion event sequence in the communication pattern with the machine learning function; and
generating a graphical simulation of the intrusion event sequence.

* * * * *